June 3, 1969

F. BARTU 3,447,920

PROCESS OF MELTING SCRAP OR ANOTHER SOLID
METALLIC CHARGE

Filed June 18, 1965

INVENTOR:
FRANZ BARTU

BY
Howson & Howson
ATTYS.

United States Patent Office 3,447,920
Patented June 3, 1969

3,447,920
PROCESS OF MELTING SCRAP OR ANOTHER SOLID METALLIC CHARGE
Franz Bartu, Kusnacht-Zurich, Switzerland, assignor to Maerz Ofenbau, AG., Zurich, Switzerland, a corporation of Switzerland
Filed June 18, 1965, Ser. No. 464,915
Claims priority, application Austria, July 8, 1964, A 5,852/64
Int. Cl. C21c 5/32
U.S. Cl. 75—43                              3 Claims

ABSTRACT OF THE DISCLOSURE

The invention relates to the melting of a solid metallic charge, such as scrap, in a furnace comprising two interconnected vessels, i.e. a preheating vessel and a melting vessel, which are arranged one behind the other and are used in alternation, the metallic charge being melted in the melting vessel by burning an external fuel, i.e. a fuel supplied from outside of the furnace, therein and the resulting hot flue gases being transferred to the preheating vessel for preheating solid metallic charge therein. Both vessels are heated always at the same time by burning external fuels therein simultaneously, using in the melting vessel an oxygen-containing gas having a higher oxygen content than the oxygen-containing gas for burning the fuel in the preheating vessel.

---

Figure 1:
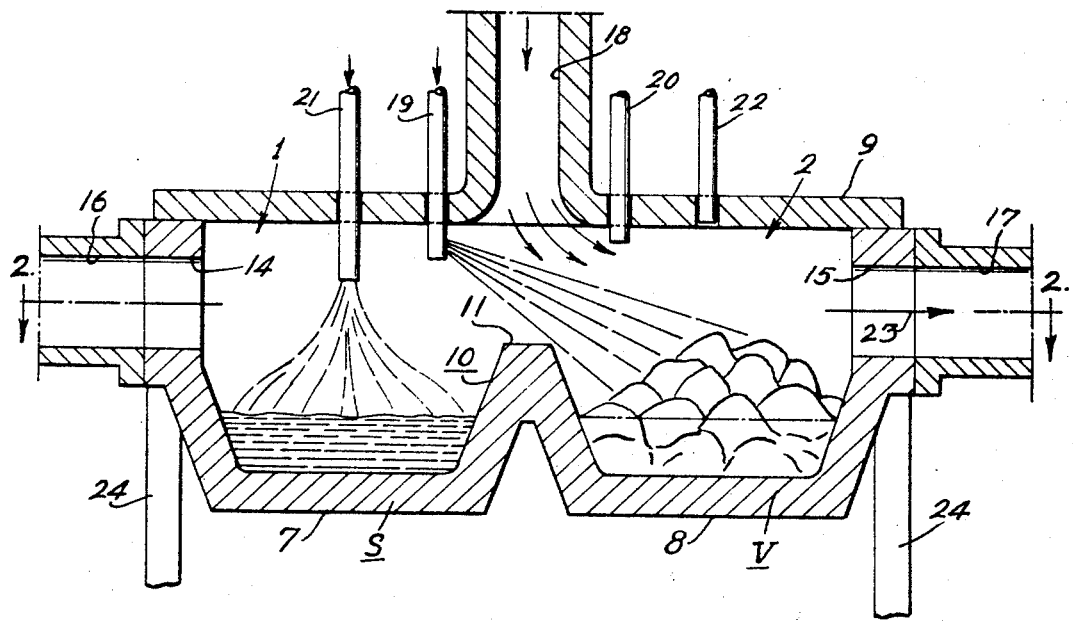

This invention relates to a process of melting scrap or another solid metallic charge, and to a furnace for carrying out this process.

The melting of a solid metallic charge in a fuel-fired furnace has been enabled only with the aid of regenerative air preheating or of the open-hearth furnace respectively. The combustion air must be preheated to above 1000° C. so that a sufficiently high flame temperature and a sufficiently large transferable heat can be attained. The transferable heat is the heat quantity which can be delivered per fuel calory from the flame or the flue gases when cooling them to the flue gas temperature in the hearth chamber.

Alternatively, a high flame temperature and large transferable heat can be obtained by burning the fuel with gaseous oxygen. In this case, the flame temperature is much higher than in case of the conventional use of preheated air because the nitrogen ballast is eliminated. When fuel is burnt in an open-hearth furnace with pure oxygen, the transferable heat is approximately as large as the transferable heat obtained by a combustion of preheated air, the temperature of which lies 300 C. below the temperature of the exhaust gases leaving the hearth chamber. For instance, if the temperature of the exhaust gases is 1600° C., air of 1300° C. and pure oxygen are equivalent as to the transferable heat per fuel calory.

An addition of oxygen as a combustion-agent in the open-hearth furnace is desirable because it results in an increase in flame temperature. For this reason, this expedient is often adopted. It has also been repeatedly suggested to omit the use of preheated air entirely, and to burn the fuel only with oxygen. In such a firing operation, the entire air preheating apparatus, including the lower part of the furnace and the reversing valves, may be omitted so that the structural expenditure is much reduced.

On the other hand, it must be borne in mind that even when oxygen is available at the lowest possible price, the costs of oxygen is about 2.5 times the fuel costs whereas the costs, e.g., of regeneratively preheated air per kilogram of fuel is only about ⅕ to ⅙ of the costs of oxygen, if the costs of providing the preheating installation and the current expenses of the refractory material thereof are included. Thus, combustion with preheated air is in any case much less expensive than the combustion using pure oxygen. The latter has the advantage, however, that the oxygen flame is capable of a much larger heat transfer per square meter of hearth area per hour.

The present invention is based on the discovery that the heat transfer conditions in a fuel-fired melting furnace vary greatly during the melting operation. During the preheating of the cold charge or scrap, the heat transfer conditions are very favorable even for a flame produced by oil or cold gas and preheated air. They deteriorate, however, during the melting operation and particularly after the formation of a bath and a layer of slag, which cover the charge not yet molten.

It is the principal object of the present invention to provide a process of melting scrap or other solid metallic charge, and a furnace for carrying out this process, which utilize these relations and enable a combustion of the fuel with preheated air during the heating of the cold charge, and with oxygen during the melting of the charge.

This practice enables the utilization of the good heat transfer from the flame formed in the combustion of fuel with hot air to the charge or scrap when the same is cold or has not yet been heated to the melting point. Further this practice makes it possible to use oxygen only in that phase in which the flame of fuel and hot air has a poor heat efficiency. Thus the final result is a reduction of the consumption of relatively expensive oxygen.

To accomplish this object, the process according to the invention is carried out in a furnace which consists of two interconnected zones or vessels, which are arranged one behind the other, and is characterized in that the two zones or vessels are heated at the same time. Different phases of the melting process are carried out at the same time in the two zones. In one zone, referred to as the melting zone, preheated charge is molten with a fuel-oxygen flame, with an addition of some air, if desired. Solid charge is introduced into the second zone, referred to as the preheating zone, and is preheated therein with a flame of fuel and preheated air, to which small amounts of oxygen may be added, if desired. The hot flue gases of the melting zone are transferred into the preheating zone, where residual CO is burnt. These flue gases serve as an additional fuel in the preheating zone and are then passed together with the flue gases of the flame of the preheating zone into an air preheater, where the combustion air for the plant is preheated. This arrangement enables a high utilization of the waste heat from both zones and the use of only one air preheater for both zones. Owing to the low exhaust gas temperature of the preheating zone, this air preheater is not subjected to high stresses due to temperature or to the flue dust.

Figure 2:
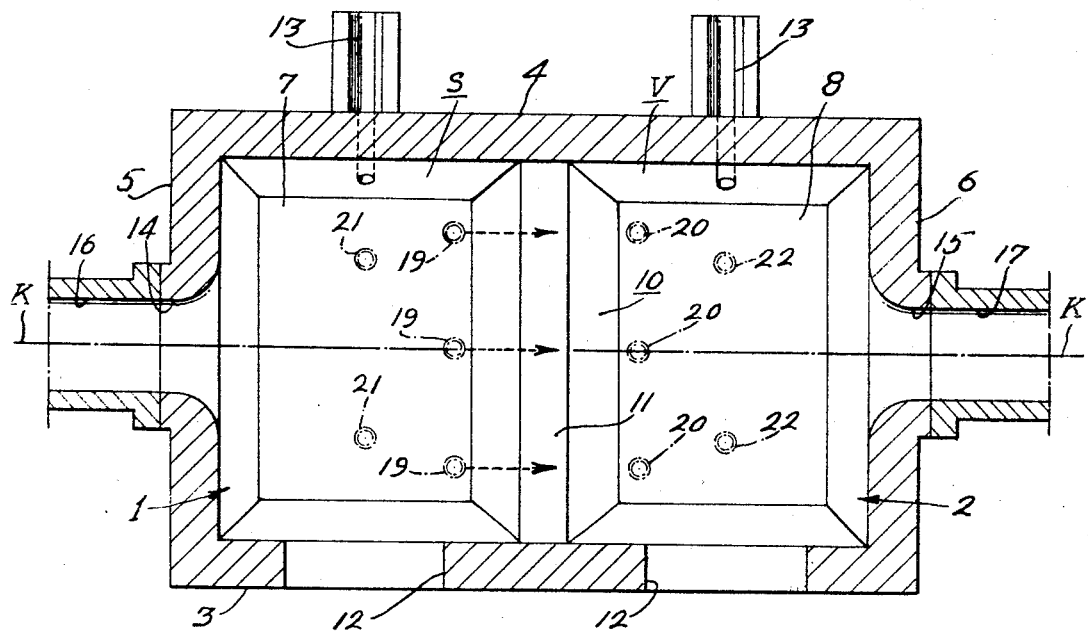

The invention will be explained more fully hereinafter with reference to the drawing in which:

FIG. 1 is a longitudinal sectional view taken on line I—I of FIG. 2 and showing a furnace according to the invention, and FIG. 2 is a horizontal sectional view taken on line II—II of FIG. 1.

It may be stated here that a double furnace consisting of two interconnected zones or vessels arranged one behind the other is already known for the manufacture of steel. In a known process carried out in such a furnace, melting and refining are conducted in the first zone and the sensible heat of the exhaust gases from this zone is utilized for preheating the cold charge or scrap in the second zone. In this process, only the first zone is heated, in which melting is being conducted. In a more recently disclosed process for refining pig-iron in a furnace which consists of two interconnected zones, which are arranged one behind the other and used in alternation, a charge is refined and finished in one zone, the refining zone, and the CO-containing, hot exhaust gases formed during refining are introduced into the second or preheating zone, where they are burned for preheating the solid metallic charge (British Patent 916,763). In this process, additional fuel may be introduced into the second zone, if desired, if the heat delivered by the exhaust gases of the refining zone is not sufficient. In this case too, only one zone is being heated at a time, and there is no simultaneous firing of fuel in both zones.

According to the present invention, the fuels are burned in the two zones with combustion-agents (oxygen-containing gases) having different oxygen concentrations. In a preferred embodiment of the invention, at least 65% of the fuel is burned with oxygen gas and up to 35% with preheated air in the melting zone, whereas in the preheating zone at least 65% of the fuel is burned with preheated air and up to 35% with oxygen.

When oxygen or a high-oxygen mixture is used as a combustion-agent in the melting zone, the exhaust gases from this vessel have a high carbon dioxide content and the zone atmosphere is highly oxidizing. During melting, a highly oxidizing atmosphere may be detrimental to the molten bath. For this reason it may be necessary to maintain an oxygen deficiency in the melting zone and to produce a reducing atmosphere in this zone. Under the influence of the incandescent or melting scrap, the equilibrium of the combustion $2CO+O_2 \rightleftharpoons 2CO_2$ may be shifted in favor of a higher CO content in the melting zone. Thus, the exhaust gases from the melting zone may temporarily contain relatively large amounts of carbon monoxide. The chemical heat of these gases may be advantageously utilized for preheating the charge by burning these gases in the preheating zone. The use of a furnace consisting of two interconnected zones, which are arranged one behind the other, enables the adjustment of an oxidizing or reducing atmosphere in the melting zone without detrimental results as to the heat transfer in the process because the unburned exhaust gases from the melting zone can be completely burned and utilized in the preheating zone.

The present invention relates to the melting rather than the refining and finishing of a charge. The charge which has been liquefied in the melting zone may be finished in the melting zone or may be tapped without further treatment and refined and alloyed in another furnace. If the charge is finished in the melting zone, the flue gases produced during this time in the melting zone are also used in the preheating zone for preheating the scrap.

As is apparent from the above, the furnace according to the present invention comprises in known manner two interconnected vessels, which are arranged in open gas-flow communication one behind the other. The two vessels may consist of stationary or tiltable hearth furnaces. Alternatively, the two vessels may be rigidly interconnected and also tiltable. This last-mentioned embodiment has the advantage that only a single tilting appartus is required.

In the process according to the present invention it is desirable to use recuperatively preheated air. The exhaust gas temperature of the preheating zone is much lower than the exhaust gas temperature of the hearth of an open-hearth furnace. This enables the use of a recuperator, which is simpler and less expensive than a regenerator. The preheated combustion air may be separately supplied in a separate conduit to each burner, or a common air supply may be provided, which is arranged for use with both zones so that it makes no difference which of the two zones is to be heated at a given time with the fuel-air flame. In this case the air for combustion is sucked to the flame by the momentum of the burners, which are arranged in a suitable relation to the outlet of the supply conduit. Where a single air conduit is provided, its outlet is disposed between the two zones. The air may be supplied between the two zones from below or above or through the side walls.

Each zone has at least one burner or a plurality of burners. The same burners may be provided for the combustion with oxygen and for the combustion with hot air. Alternatively, there may be separate "oxygen burners" and separate "air burners." If each zone is provided with a plurality of burners, these are arranged, in a preferred embodiment, at right angles to the longitudinal axis of the furnace. Most suitably, the burners are installed in the arched roof.

It may be stated that a plurality of oil-oxygen or gas-oxygen burners in an open-hearth furnace is introduced in most cases through the arched roof and are always arranged in the centre plane one behind the other in the longitudinal direction of the furnace. Thus, the burners are disposed in a row which is parallel to the flow of the flue gases. This arrangement has the disadvantage that the flue gases are reversed when the flame impinges on the bath and apply very high stresses to the side walls of the furnace. This disadvantage is avoided by the arrangement of the burners in a row extending transversely to the longitudinal axis of the furnace in the double furnace according to the present invention. It is also suitable to use vessels which are smaller in length than in width. According to a preferred embodiment, each of the front and back walls of the two vessels forms a unit, which extends continuously from the outer end wall of one vessel to the outer end wall of the other vessel. In this case, the two vessels for holding the metal to be molten are separated only by the fire bridge whereas those parts of the two vessels which are disposed above this fire bridge form a unit.

As the combustion is mainly effected with oxygen in the melting zone or vessel and mainly with air in the preheating zone or vessel, the flame volume per fuel calory in the preheating zone is about 4 to 5 times as large as that in the melting zone. Due to the large flame volume and the large momentum of the preheating flame in the preheating zone, the relatively small flue gas volume of the melting zone is easily sucked, and it is not required to make special provision for conducting the flue gases from the melting zone into the preheating zone.

Referring then to the drawing, the furnace, according to the invention comprises two vessels or zones, 1 and 2. At a given time, one of these vessels is being used as a preheating vessel, and the other one at the same time as a melting vessel. In the embodiment shown by way of example, the two vessels 1 and 2 are firmly interconnected and form a furnace, which comprises a front wall 3, a back wall 4 and end walls 5 and 6. The two vessels 1 and 2 have floors 7 and 8, respectively, and are closed at the top by a roof 9, which in the embodiment shown by way of example is co-extensive with the entire furnace.

A fire bridge 10 is disposed between the two vessels 1 and 2. The top 11 of this bridge is disposed a predetermined distance above the bath level in operation.

The front wall 3 of the furnace is formed with charging openings 12, which are diagrammatically indicated in FIG. 2 and can be closed in known manner with doors, not shown. Tapping spouts 13 are connected to the back wall 4 and need not be explained in more detail. The two end walls 5 and 6 of the furnace have fluid gas passages 14 and 15, respectively, and a flue, 16 or 17 respectively, is connected to each of these passages. These flues extend suitably to an air preheater, which may be operated as a regenerator or as a recuperator. As in the furnace according to the present invention the exhaust gases are always fed to the air preheater from the vessel being used as a preheating vessel, the air preheater is preferably designed as a recuperator owing to the relatively low temperature of the flue gases flowing from the preheating vessel, the lower construction costs and the long time required for interchanging the modes of operation of the two vessels.

In the embodiment shown by way of example, a supply duct 18 for preheated air is provided between the two vessels 1 and 2 and extends through the furnace roof 9. Alternatively, this duct might enter the furnace through the front or back wall of the furnace or from below through the fire bridge.

In each of the two vessels 1 and 2, oil or gas burners 19 and 20 and oxygen-oil or oxygen-gas burners 21 and 22 extend through the furnace roof 9 and are preferably extensible into the vessels. As is apparent from FIG. 2, the burners 19, 20, 21 and 22 are not arranged in rows parallel to the flue gas flow (indicated, e.g., by the arrow 23 in FIG. 1), as is usual, but in rows which are transverse to this flow. The width of each vessel 1, 2, measured transversely to the direction of flow of the flue gases, preferably exceeds the length of each vessel.

In the stage shown in FIG. 1, the right-hand vessel 2 has been fed with a cold charge, such as scrap, and is in operation as a preheating vessel V. At the same time, the charge preheated in the preceding stage in the left-hand vessel 1 is now molten therein. The melt may be finished in the same vessel. In the stage which is shown, the preheating vessel V, which is the right-hand vessel 2, is heated by the oil burners 19 disposed in the other vessel 1 beside the air supply duct 18. Heating oil is sprayed from these oil burners towards the preheating vessel V. The air entering through the supply duct 18 is deflected into the vessel V.

Owing to this air flow and the relatively large flame volume of the oil supplied by the burners 19 and burning with an addition of air in the preheating vessel, the flue gases from the melting vessel S, which is constituted by the left-hand vessel 1 at this time, are sucked off. The burners 20 could be used instead of the burners 19 in the same way. Oil or gas and oxygen are supplied to the melting vessel through the burners 21.

When the melting and, if desired, the finishing of the steel has been completed in vessel 1, the latter is tapped and re-charged. Then the "oxygen burners" 22 are operated for vessel 2 and the "air burners" 20 for vessel 1, so that operating conditions result which are in mirror symmetry to those of FIG. 1. The flue gases are now no longer discharged from the vessel 2 through the flue 17 to the right, but from the vessel 1, which is now the preheating vessel, through the flue 16 to the left.

The furnace according to the invention may be designed in various forms, and various modifications are possible within the scope of the invention. For instance, the furnace may be stationary or integral to form a tilting furnace, which is tiltable about the axis K—K. In this case, for instance, the hearth body may be mounted by standards 24 on rockers which are not shown. Alternatively, the furnace may consist of two separate vessels or chambers which are connected by an intermediate gas-flow path, which contains the supply conduit for the preheated air. The burners or burner tubes 19, 20 and 21, 22 need not be at right angles to the level of the melting bath but may be inclined in the direction of the flue gas flow at an angle other than 90° to the level of the molten bath.

What is claimed is:

1. In the melting of solid metallic charge in a furnace comprising two interconnected zones, a preheating zone and a melting zone arranged one behind the other, the metallic charge being melted in the melting zone by burning a fuel therein and the resulting hot flue gases being transferred to the preheating zone for preheating solid metallic charge therein, the improvement wherein both zones are heated at the same time by having fuels supplied from outside of the furnace by means of burners in both zones simultaneously, an oxygen-containing gas being used for burning the fuel in the melting zone which has a higher oxygen content then does the oxygen-containing gas used for burning the fuel in the preheating zone, and wherein, in burning the fuel in the melting zone, at least 65% thereof is burned with oxygen and up to 35% thereof is burned with preheated air, and wherein, in burning the fuel in the preheating zone, at least 65% thereof is burned with preheated air and up to 35% thereof is burned with oxygen.

2. The process of claim 1 wherein said preheated air is recuperatively preheated.

3. The process of claim 1 wherein said preheated air is admitted between said two zones.

References Cited

UNITED STATES PATENTS 3,248,211  4/1966  Klein et al. _____ 75—60

L. DEWAYNE RUTLEDGE, *Primary Examiner.*

HENRY W. TARRING, *Assistant Examiner.*

U.S. Cl. X.R.

75—65